United States Patent [19]

Ostermann et al.

[11] Patent Number: 4,484,025
[45] Date of Patent: Nov. 20, 1984

[54] SYSTEM FOR ENCIPHERING AND DECIPHERING DATA

[75] Inventors: Bernd Ostermann; Wolfgang Bitzer, both of Weissach, Fed. Rep. of Germany

[73] Assignee: Licentia Patent-Verwaltungs-GmbH, Frankfurt am Main, Fed. Rep. of Germany

[21] Appl. No.: 231,168

[22] Filed: Feb. 3, 1981

[30] Foreign Application Priority Data

Feb. 4, 1980 [DE] Fed. Rep. of Germany ....... 3003998

[51] Int. Cl.$^3$ .............................................. H04L 9/02
[52] U.S. Cl. ................................. 178/22.09; 178/22.1; 178/22.13
[58] Field of Search ................. 178/22.09, 22.13, 22.1; 179/1.5 R, 2 A

[56] References Cited

U.S. PATENT DOCUMENTS

| | | | |
|---|---|---|---|
| 4,119,815 | 10/1978 | Frankfort et al. | 179/2 A X |
| 4,123,623 | 10/1978 | McElliot | 179/2 A X |
| 4,203,166 | 5/1980 | Ehrsam et al. | 178/22.09 X |
| 4,227,253 | 10/1980 | Ehrsam et al. | 340/825.3 X |
| 4,316,055 | 2/1982 | Feistel | 178/22.13 |

FOREIGN PATENT DOCUMENTS

| | | | |
|---|---|---|---|
| 2231849 | 1/1973 | Fed. Rep. of Germany | 178/22 |
| 2558206 | 4/1977 | Fed. Rep. of Germany | 178/22 |
| 2715631 | 11/1977 | Fed. Rep. of Germany | 178/22 |

OTHER PUBLICATIONS

Needham et al., "Using Encryption for Authentication in Large Networks of Computers", Communications of the ACM, vol. 21, No. 12, Dec. 1978, pp. 993-999.
"Data Encryption Standard", Federal Information Processing Standards Publication 46, Jan. 15, 1977, pp. 1-18.

Primary Examiner—Sal Cangialosi
Assistant Examiner—K. R. Kaiser
Attorney, Agent, or Firm—Spencer & Frank

[57] ABSTRACT

A system and method for transmitting enciphered data between first and second terminals over a data transmission channel. The system comprises a transmitter located at the first terminal, a receiver located at the second terminal and cipher computers located at each of the first and second terminals. At least one of the cipher computers is programmable and has a program memory. Storage means are provided for storing a program code or algorithm and a secret cipher key, and means are further provided for transmitting the algorithm to the programmable computer for storage in its program memory. The data transmitted between the first and second terminals is enciphered in accordance with the algorithm stored in the program memory of the programmable computer and determined by the secret cipher key.

10 Claims, 2 Drawing Figures

SYSTEM FOR ENCIPHERING AND DECIPHERING DATA

BACKGROUND OF THE INVENTION

The present invention relates to a system for enciphering and deciphering data for transmission between a transmitter and a receiver, where the terms encipher and decipher are synonymous with encrypt and decrypt respectively. In particular, it relates to a system wherein clear data texts are enciphered at the transmitter end of the system and deciphered at the receiver end. Enciphering and deciphering are effected by the same set of instructions, the instructions being executed by cipher computers responsive to a cipher program stored at the transmitter and at the receiver. That is, the program of the cipher computers is determined by a secret key stored at the transmitter and at the receiver.

Such a system is disclosed, for example, in German Offenlegungsschrift No. 2,943,726, a large number of these systems being on the market. In general, they include cipher computers that operate according to special algorithms and are realized by digital circuits in the form of large-scale integrated circuits (LSI). A disadvantage of such systems is that only those having the same cipher algorithm can work together.

With the introduction of increasingly extensive communications networks, including international networks, there is an increasing demand for enciphered information exchanges. While standardization of the cipher algorithms would be one solution to the problem, it appears unlikely that each standardization will be realized for some time, one reason being that ciphering devices employing different kinds of cipher algorithms have already been introduced into commercial use.

It is an object of the present invention to provide a cipher system which permits the wide exchange of enciphered information without requiring standardization of the cipher algorithms, and which makes possible the continued use of already available ciphering devices.

SUMMARY OF THE INVENTION

The cipher system according to the invention permits the wide exchange of enciphered information over a primary transmission channel without requiring the standardized use of a uniform cipher algorithm. A further advantage is that ciphering devices already on the market can be used.

In accordance with the present invention, a system and method are provided for transmitting enciphered data between first and second terminals over a data transmission channel. The system comprises a transmitter located at the first terminal, a receiver located at the second terminal and cipher computers located at each of the first and second terminals. At least one of the cipher computers is programmable and has a program memory. Storage means are provided for storing a program code, and means are further provided for transmitting the program code to the programmable computer for storage in its program memory. The data transmitted between the first and second terminals is enciphered in accordance with the cipher program code and the cipher key stored in the program memory of the programmable computer.

DESCRIPTION OF THE PREFERRED EMBODIMENTS

Figure 1:
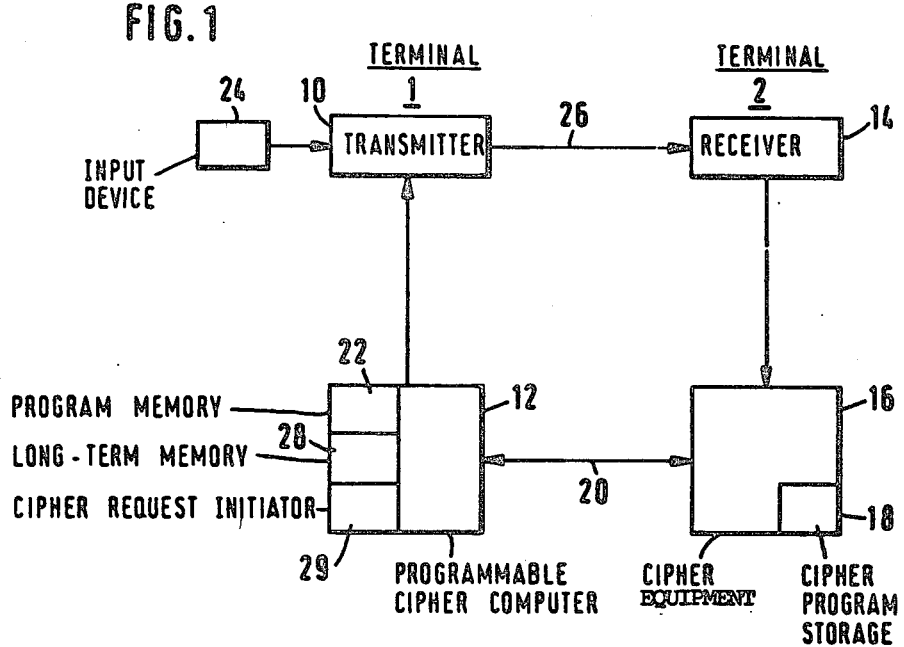
FIG. 1 is a block diagram showing the basic elements of one embodiment of the invention wherein a cipher algorithm is transmitted from a cipher equipment at a receiving terminal to a programmable cipher computer at the transmitting terminal.

Referring to FIG. 1, there is shown one embodiment of the invention wherein a transmitter 10 and programmable cipher computer 12 are located at a terminal 1 of a communications system, and a receiver 14 and cipher equipment 16 at the other terminal 2. In a practical communications system, a receiver would also be provided at terminal 1 and a transmitter at terminal 2, but these have been omitted to avoid complicating the description. Also, the cipher equipment at terminal 2 could be programmable.

The cipher equipment 16 at terminal 2 comprises a conventional firmware enciphering computer and may be a microprocessor such as the commercially available type 8085 manufactured by INTEL Corporation having a cipher program storage 18 for storing a cipher algorithm. The cipher algorithm is introduced into the cipher program storage 18 by insertion of preprogrammed read-only-memories (ROM) or electrically programmable read-only-memories (PROM). The cipher equipment 16 may be a fixed wired digital circuit made up of integrated circuits and need not be programmable microcomputer system.

The cipher algorithm is transmitted from the cipher program storage 18 over a data transmission channel 20 to the program memory 22 of the programmable cipher computer 12. The programmable cipher computer 12 may also be a type 8085 microprocessor manufactured by INTEL Corporation. The cipher algorithm transmitted from the cipher program storage 18 of cipher equipment 16 via channel 20 is stored in program memory 22 and used to encipher the clear input data provided by input device 24 to transmitter 10. Alternatively, the cipher algorithm can be transmitted over the data transmission channel 26 linking transmitter 10 and receiver 14. More specifically, the algorithm for enciphering and deciphering contained in the cipher program may for instance be the "Data Encryption Standard", described in FIPS PUB 46, U.S. Department of Commerce/National Bureau of Standards, Jan. 15, 1977, published by the NATIONAL TECHNICAL SERVICES, U.S. Department of Commerce, Springfield, Va. 22161.

In another embodiment of the invention, the programmable cipher computer 12 is provided with a long-term memory 28 for storage of a plurality of different cipher programs which can be called up for storage in the program memory 22 as required. An advantage of this arrangement is that when there is a second data connection with another terminal, such as terminal 2, it is unnecessary to retransmit the entire cipher program. The long-term memory can, in a primitive form, be a punched tape reader into which the cipher program at terminal 2 is fed by the use of a punched tape, but normally the long-term memory consists of preprogrammed read-only memories or a magnetic storage device.

Transmission of a cipher program can also be initiated at the programmable cipher computer 12 by means of a cipher request initiator 29. This permits the transmitting terminal 1 to request that the cipher algorithm be transmitted from the receiving terminal 2 prior to transmission.

The cipher programs are stored in the long-term memory in binary form normally in the machine code used by the programmable cipher computer 12 to execute the cipher program, and are transferred into the program memory 22 for instance by a serial byte-to-byte transmission controlled by the computer 12. This transfer is initiated by the cipher equipment 12 after reception of a bit sequence from cipher computer 16 containing the information as to which cipher program from long-term memory 28 is to be used.

Figure 2:
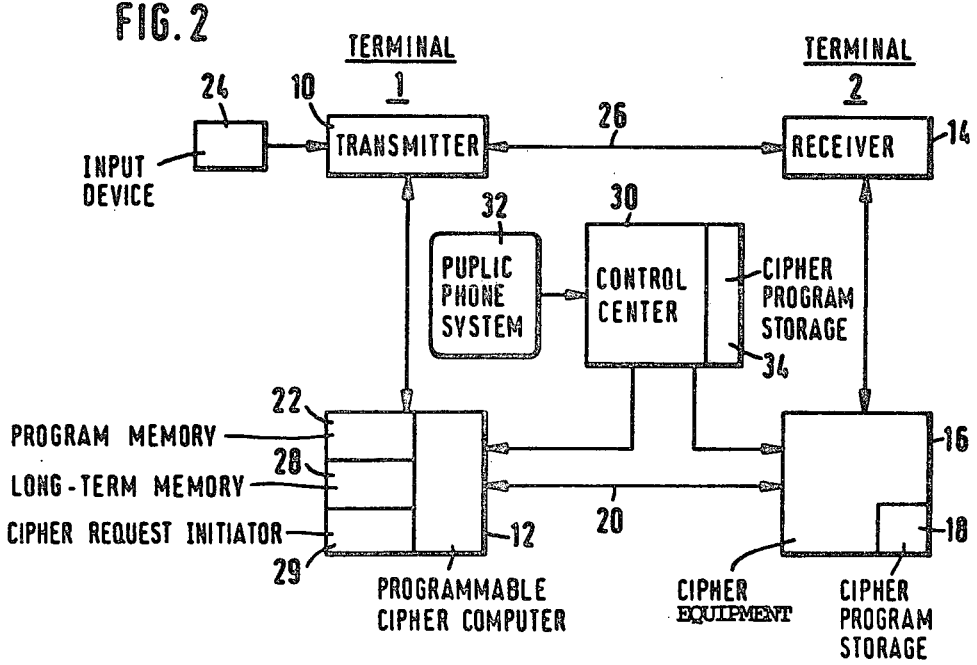
FIG. 2 is a block diagram showing another embodiment of the invention which employs a control center for initiating transmission of a program code containing the cipher algorithm to the programmable cipher computer.

Still another embodiment of the invention is shown in FIG. 2 wherein a control center 30 is provided at a central location which can be actuated through a public telephone system 32. The desired cipher program can be made available by dialing the user number or, in some cases, an added user identification. (The term "dialing" includes all forms of telephone actuation systems including dial and push-button systems. Also, connections between terminals and the control center may be by wire, microwave radio, satellite, etc.) By dialing the control center 30, the cipher equipment 16 at terminal 2 can be instructed to transmit the cipher algorithm from the cipher program storage 18 to the programmable cipher computer 12. A cipher program storage 34 can also be located in the control center for storage of the cipher programs and distribution to the programmable cipher computers at the various terminals. This is advantageous because the centrally located control center can be reached automatically when the user number is dialed and the cipher programs stored in the cipher program storage 34 called up for distribution as required.

If the cipher program used by equipment 16 is not available in the storage 34 of control center 30, the control center sends a bit sequence to equipment 16 which initiates transmission of the contents of its cipher program storage 18 via line 20 to the program memory 22 of computer 12 and, for actualization of the storage 34, also to the control center 30.

Valuable transmission time can be saved if the programmable cipher computer is equipped with a long-term memory 28 in which the various cipher programs are stored and from which the corresponding cipher program can be provided to the programmable cipher computer upon call-up by the control center 30 by means of a short identifying signal. The control center 30 is actuated to transfer the proper cipher program from the cipher program storage 34 to computer 12 by a bit sequence, which has been transmitted from the cipher computer to the control center 30 containing identification codes of both the transmitter 10 and the addressed receiver 14.

A condition which the system must satisfy is that the various code programs per se need not be kept secret, are permitted to be made public and in part can even be publicized, as disclosed in German Auslegeschrift No. 2,558,206, German Offenlegungsschriften Nos. 2,715,631 and 2,231,849 and in "Data Encryption Standard"—FIPS PUB 46 by the U.S. National Bureau of Standards, Jan. 15, 1977. As discussed in these publications, the key constitutes the actual element which is to be kept secret and must therefore be delivered to the user by secure means. That is, it must be protected against unauthorized access by third parties. The mere knowledge of the cipher algorithm by a third party does not provide him with a starting point for unauthorized deciphering.

It will be understood that the above description of the present invention is susceptible to various modifications, changes and adaptations, and the same are intended to be comprehended within the meaning and range of equivalents of the appended claims.

What is claimed is:

1. A system for transmitting enciphered data over a data transmission channel between first and second terminals of a communications network wherein more than one cipher algorithm may be utilized, and wherein a clear data text is enciphered at said first terminal and, after being transmitted, deciphered at said second terminal according to a predetermined fixed cipher algorithm and according to a cipher key, said cipher key being stored at said first and second terminals, comprising:

a transmitter located at said first terminal for receiving said clear data text;

a receiver located at said second terminal;

a programmable cipher computer having a program memory and storing said cipher key, said programmable cipher computer being located at one of said first and second terminals;

a cipher equipment having a read only cipher program storage, a predetermined fixed cipher algorithm and said cipher key being stored in said cipher program storage, said cipher equipment being located at the other of said first and second terminals;

means for storing said predetermined fixed cipher algorithm at a location remote from said one terminal;

means for transmitting said predetermined fixed cipher algorithm from said storing means at said location remote from said one terminal over a transmission channel of said communications network to said programmable cipher computer and storing said predetermined fixed cipher algorithm in said program memory;

means for enciphering the clear data text received at said transmitter in accordance with said predetermined fixed cipher algorithm and said cipher key, said transmitter transmitting the enciphered data to said receiver; and means for deciphering the ciphered data text received at said receiver in accordance with said predetermined fixed cipher algorithm and said cipher key.

2. A system as defined in claim 1, wherein said storing means is the read only cipher program storage of said cipher equipment, and wherein said cipher algorithm is read out and transmitted over said data transmission channel.

3. A system as defined in claim 2 wherein said programmable cipher computer further comprises a cipher request initiator, said cipher equipment transmitting said predetermined fixed cipher algorithm to said programmable cipher computer upon receiving an initiation signal from said cipher request initiator.

4. A system as defined in claim 1, which further comprises a control center, the transfer of said predetermined fixed cipher algorithm from said storing means to said program memory of said programmable cipher computer being actuated by said control center.

5. A system as defined in claim 4 which further comprises a public phone system coupled to said control center for initiating transmission of said initiation signal by said control center.

6. A system as defined in claim 4 or 5 wherein said cipher algorithm is stored at said control center.

7. A system as defined in claim 1 wherein said programmable cipher computer further comprises a long-term memory for storing said cipher algorithm, said algorithm being transferred to said program memory upon receipt of a signal from said cipher equipment.

8. The method of transmitting enciphered data over a data transmission channel between first and second terminals of a communications network wherein more than one cipher algorithm may be utilized, a programmable cipher computer being located at one of said first and second terminals, said programmable cipher computer having a program memory and storing a cipher key; and a cipher equipment being located at the other of first and second terminals, said cipher equipment having a read only cipher program storage, a predetermined fixed cipher algorithm and said cipher key being stored in said cipher program storage, said method comprising the steps of:

storing said predetermined fixed cipher algorithm in a program memory at a location remote from said one terminal;

transmitting said predetermined cipher algorithm from said program memory at the location remote from said one terminal to said programmable cipher computer over a data transmission channel of said communications network;

storing said transmitted predetermined cipher algorithm in the program memory of said programmable cipher computer;

inputting clear data text to a transmitter located at said first terminal;

enciphering said clear data text in accordance with said predetermined fixed cipher algorithm and said cipher key;

transmitting the enciphered data over said data transmission channel to a receiver located at said second terminal; and deciphering and enciphered data at said receiver in accordance with said predetermined fixed cipher algorithm and said cipher key.

9. The method defined in claim 8 wherein the program memory at said location remote from said one terminal is the read only cipher program storage of said cipher equipment.

10. The method defined in claim 9 wherein said cipher algorithm is transmitted over said data transmission channel.

* * * * *